US010383163B2

(12) United States Patent
Österlund et al.

(10) Patent No.: US 10,383,163 B2
(45) Date of Patent: Aug. 13, 2019

(54) ENHANCEMENTS TO TERMINATING ACCESS DOMAIN SELECTION

(71) Applicant: TELEFONAKTIEBOLAGET LM ERICSSON (PUBL), Stockholm (SE)

(72) Inventors: Håkan Österlund, Ekerö (SE); Afshin Abtin, Sollentuna (SE); Daniel Nilsson, Älvängen (SE); Ann-Christine Sander, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/561,721

(22) PCT Filed: Apr. 15, 2015

(86) PCT No.: PCT/EP2015/058170
§ 371 (c)(1),
(2) Date: Sep. 26, 2017

(87) PCT Pub. No.: WO2016/165757
PCT Pub. Date: Oct. 20, 2016

(65) Prior Publication Data
US 2018/0110089 A1    Apr. 19, 2018

(51) Int. Cl.
H04W 8/04      (2009.01)
H04W 76/16     (2018.01)
(Continued)

(52) U.S. Cl.
CPC .......... *H04W 76/16* (2018.02); *H04L 65/104* (2013.01); *H04L 65/1016* (2013.01);
(Continued)

(58) Field of Classification Search
None
See application file for complete search history.

(56) References Cited

U.S. PATENT DOCUMENTS

2012/0106324 A1   5/2012  Keller et al.
2013/0272267 A1*  10/2013 Nishida ............... H04W 8/08
                                                    370/331
(Continued)

FOREIGN PATENT DOCUMENTS

WO    2015018448 A1    2/2015

OTHER PUBLICATIONS

3GPP, "3rd Generation Partnership Project; Technical Specification Group Core Network and Terminals; IP Multimedia (IM) Subsystem Sh interface; Signalling flows and message contents (Release 12)," 3GPP TS 29.328 v12.7.0, Dec. 2014.
(Continued)

Primary Examiner — Vladimir Magloire
Assistant Examiner — Donald H B Braswell
(74) Attorney, Agent, or Firm — Patent Portfolio Builders PLLC

(57) ABSTRACT

A method of determining in an IP multimedia subsystem, IMS, network which radio access type, RAT, should be used to route a terminating session directed towards a user equipment, UE. The HSS receives a terminating access domain selection, T-ADS, query from an application server, AS, of the IMS network, the T-ADS query relating to the terminating session and identifying the UE; and determines whether a packet data network gateway, PDN-GW, is registered for the UE. In the case where a PDN-GW is registered, the HSS sends a RAT request towards the PDN-GW, the RAT request identifying the UE and requesting a RAT used by the UE to connect to the IMS network. The PDN-GW determines the RAT and sends the result towards the HSS, which sends a T-ADS response to the AS indicating the RAT. In the case where a PDN-GW is not registered, the HSS sends a T-ADS response to the AS indicating that the RAT is a circuit switched RAT. Apparatus for implementing the method are also provided.

11 Claims, 4 Drawing Sheets

(51) Int. Cl.
H04L 29/06 (2006.01)
H04W 76/12 (2018.01)
(52) U.S. Cl.
CPC ...... *H04L 65/1063* (2013.01); *H04L 65/1069* (2013.01); *H04W 8/04* (2013.01); *H04W 76/12* (2018.02)

(56) References Cited

U.S. PATENT DOCUMENTS

| 2015/0036587 A1* | 2/2015 | Avula | H04W 8/10 370/328 |
| 2015/0256349 A1* | 9/2015 | Kim | H04L 12/1407 370/259 |

OTHER PUBLICATIONS

3GPP, "3rd Generation Partnership Project; Technical Specification Group Services and System Aspects; Architecture enhancements for non-3GPP accesses (Release 13)," 3GPP TS 23.402 v13.0.0, Dec. 2014.

3GPP, "3rd Generation Partnership Project; Technical Specification Group Services and System Aspects; IP Multimedia Subsystem (IMS) centralized services; Stage 2 (Release 13)," 3GPP TS 23.292 v13.1.0, Dec. 2014.

International Search Report and Written Opinion dated Dec. 7, 2015 in related International Application No. PCT/EP2015/058170.

* cited by examiner

ENHANCEMENTS TO TERMINATING ACCESS DOMAIN SELECTION

TECHNICAL FIELD

The present invention relates to terminating access domain selection in a telecommunications network comprising an IMS. In particular, the invention relates to improved methods for terminating access domain selection, and apparatus for implementing the methods.

BACKGROUND

Terminating Access Domain Selection (T-ADS) is a procedure in an IMS-enabled telecommunications network to determine the access which should be used to route a terminating voice call to a user equipment (UE) (i.e. a call directed to the UE). In order to correctly handle the call, the SCC-AS of the IMS needs to know which access type the UE is connected via, for example the handling of the call will differ significantly between a 2G access such as GSM, and an LTE access such as E-UTRAN.

In order to obtain the radio access type (RAT) used by the UE, the SCC-AS sends a T-ADS query to the home subscriber server, HSS, of the IMS network. The HSS then queries the mobility management entity, MME, and/or SGSN to determine which RATs the UE is attached to, and a timestamp indicating the time of attachment or of the latest location update from the UE over each RAT. The RAT corresponding to the most recent update is assumed to be the RAT currently in use by the UE, and the HSS provides the identity of this RAT to the SCC-AS so that the SCC-AS can route the call appropriately. This mechanism is defined in 3GPP TS 23.292 v13.1.0, and the operation of the HSS is described in Annex E of 3GPP TS 29.328 v12.7.0.

SUMMARY

Many users now desire the ability to make and receive voice calls over wireless access networks (WLANs), e.g. WiFi networks. Furthermore, dual radio implementations mean that a UE may be active on both a WLAN and a traditional mobile RAT (i.e. a 2G, 3G, or LTE access), with different PDN connections active on different RATs. The current T-ADS procedure will fail in the case where the UE is connected only to a WLAN, and will route the call via the traditional mobile RAT in the case of a dual radio connection. Therefore, the current T-ADS procedure is clearly not sufficient for the case where the UE is connected to the IMS via a WLAN.

According to an aspect of the present invention, there is provided a method of determining in an IP multimedia subsystem, IMS, network which radio access type, RAT, should be used to route a terminating session directed towards a user equipment, UE. The HSS receives a terminating access domain selection, T-ADS, query from an application server, AS, of the IMS network, the T-ADS query relating to the terminating session and identifying the UE; and determines whether a packet data network gateway, PDN-GW, is registered for the UE. In the case where a PDN-GW is registered, the HSS sends a RAT request towards the PDN-GW, the RAT request identifying the UE and requesting a RAT used by the UE to connect to the IMS network. The PDN-GW determines the RAT and sends the result towards the HSS, which sends a T-ADS response to the AS indicating the RAT. In the case where a PDN-GW is not registered, the HSS sends a T-ADS response to the AS indicating that the RAT is a circuit switched RAT.

According to a further aspect, there is provided apparatus configured to operate as a home subscriber server, HSS, in an IP multimedia subsystem, IMS, network. the apparatus comprising a first transceiver, a second transceiver, and a T-ADS processor. The first transceiver is configured to communicate with an AS of the IMS. The second transceiver is configured to communicate with a PDN-GW. The T-ADS processor is configured to:
  receive, via the first transceiver, a T-ADS query from the AS, the T-ADS query relating to a terminating session and identifying a user equipment, UE;
  determine whether the PDN-GW is registered for the UE;
  in the case where the PDN-GW is registered:
    send, via the second transceiver, a radio access type, RAT, request towards the PDN-GW, the request identifying the UE and requesting a RAT used by the UE to connect to the IMS network;
    receive, via the second transceiver, a result indicating the RAT from the PDN-GW;
    send, via the first transceiver, a T-ADS response to the AS indicating the RAT;
  in the case where the PDN-GW is not registered:
    send, via the first transceiver, a T-ADS response to the AS indicating that the RAT is a circuit switched RAT.

According to a yet further aspect, there is provided apparatus configured to operate as a packet data network gateway, PDN-GW, in a telecommunications network comprising an IP multimedia subsystem, IMS, network. The apparatus comprises a transceiver and a RAT request processor. The transceiver is configured to communicate with the HSS. The RAT request processor is configured to:
  receive, from the HSS via the transceiver, a RAT request identifying a user equipment, UE, and requesting a RAT used by the UE to connect to the IMS;
  determine the RAT;
  send the result to the HSS via the transceiver.

According to a yet further aspect, there is provided apparatus configured to operate as an authentication, authorisation, and accounting, AAA server in a telecommunications network comprising an IP multimedia subsystem, IMS, network. The apparatus comprises a first transceiver, a second transceiver, and a RAT request processor. The first transceiver is configured to communicate with the HSS. The second transceiver is configured to communicate with the PDN-GW. The RAT request processor is configured to:
  receive a RAT request from the HSS via the first transceiver, the RAT request identifying a UE;
  determine whether the PDN-GW is registered for the UE;
  in the case where the PDN-GW is registered:
    send the RAT request to the PDN-GW via the second transceiver;
    receive a result from the PDN-GW via the second transceiver;
    send the result to the HSS via the first transceiver;
  in the case where the PDN-GW is not registered:
    send a response to the HSS via the first transceiver, the response indicating that the PDN-GW is not registered.

According to a final aspect, there is provided a computer program comprising computer readable code, which, when run on an apparatus, causes the apparatus to perform a method according to the first aspect.

Further embodiments of the invention are provided in the dependent claims.

DETAILED DESCRIPTION

Enhancements to the T-ADS mechanism are proposed to allow the HSS to correctly detect when the UE is connected to a WLAN. This method replaces the current operation of the HSS during T-ADS. Instead of querying the MME or SGSN as in current methods, the HSS sends a query towards the PDN-GW. The PDN-GW is involved in any packet switched RAT, and is aware of the RAT used by the UE. If no PDN-GW is registered for the UE, then the RAT must be a circuit switched type.

Figure 1:
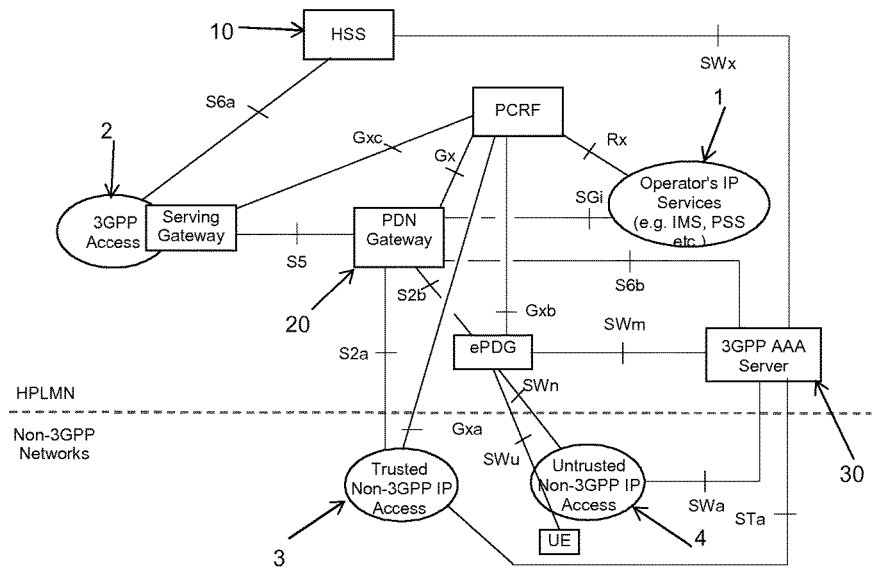
FIG. 1 is a schematic overview of the network architecture for a telecommunications network comprising an IMS network.

An overview of the network architecture is shown in FIG. 1. The UE may connect to the operators IP services (1, including IMS) via a circuit switched access type (not shown), a 3GPP access (2, e.g. UTRAN, E-UTRAN), or a non-3GPP IP access (e.g. WLAN). The non-3GPP access may be trusted (3, e.g. a trusted wireless access network, TWAN) or untrusted (4). As can be readily seen from the Figure, in each case except for the circuit switched RAT, the connection between the UE and the IMS passes through the PDN-GW (20). The UE registers with a PDN-GW, and data about this registration is stored in the HSS (10) and AAA server (20)

Figure 2:
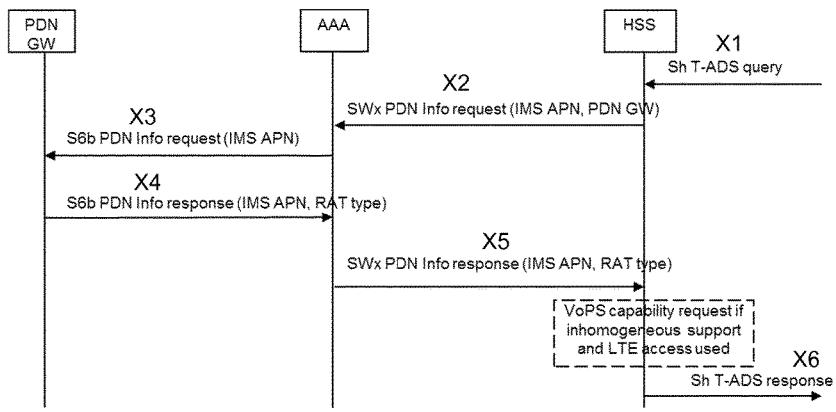
FIG. 2 shows the signalling involved in a method of an embodiment.
Figure 3:
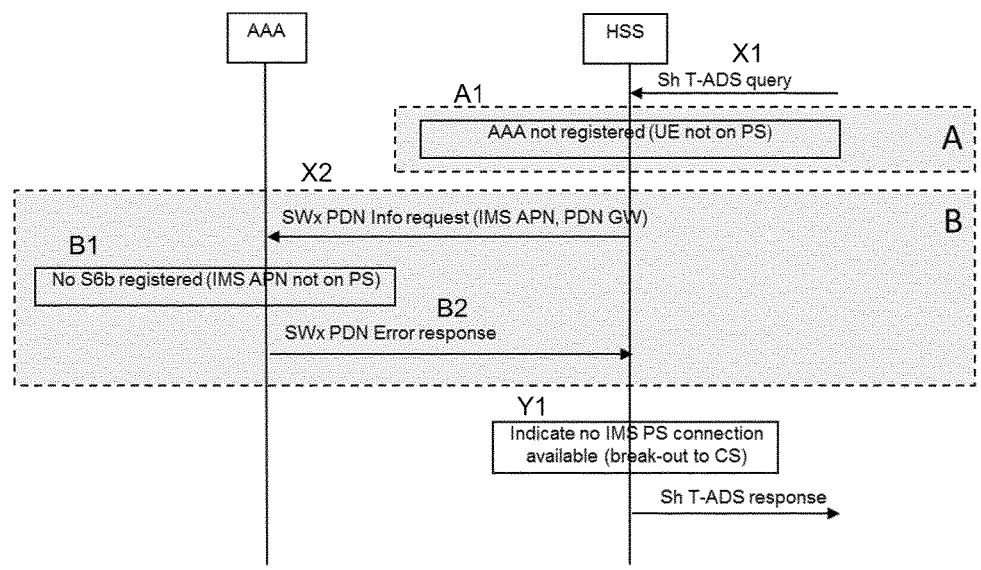
FIG. 3 shows the signalling involved in an alternate case of the embodiment of FIG. 2.

FIGS. 2 and 3 show the signalling involved in the method. FIG. 2 shows the case of a successful query to the PDN-GW, and FIG. 3 shows two possible cases of an unsuccessful query.

The HSS receives a T-ADS query (X1) from the SCC-AS over the Sh interface. The T-ADS query identifies the UE for which the RAT is required. The HSS determines whether an AAA server is registered for the UE. If no AAA server is registered (A1), the RAT must be circuit switched (as any packet switched RAT would require an AAA server). If the AAA server is registered, the HSS sends a PDN connection information request (X2) to the PGN-GW via the AAA server, which requests the RAT used for the IMS PDN connection of the UE.

The AAA server determines whether a PDN-GW is registered for the UE. If no PDN-GW is registered (B1), the AAA server returns a response (B2) to the HSS either indicating that the RAT is circuit switched, or indicating that there was an error contacting the PDN-GW. If the PDN-GW is registered, the AAA server forwards the PDN connection information request (X3) to the PDN-GW.

The PDN-GW determines the RAT used for the IMS PDN connection of the UE, and returns the RAT in a response (X4, X5) to the HSS (sent via the AAA server). The HSS then sends a T-ADS response (X6) to the SCC-AS indicating the RAT (i.e. the RAT returned by the PDN-GW, or that the RAT is circuit switched (Y1) if no PDN-GW was registered for the UE).

Under current standards, the communication between the HSS and the PDN-GW happens over the SWx and S6b interfaces, via the AAA server. Implementing the current method would require both of these interfaces to be kept open while the UE is connected to the IMS via a packet switched RAT, which is not required by current standards. As an alternative, a new interface may be used between the HSS and the PDN-GW, which would be kept open while a UE served by the HSS is registered with the PDN-GW. This would function similarly to the method described above, except that the AAA server is no longer involved and the HSS and PDN-GW communicate directly (i.e. the HSS determines whether a PDN-GW is registered, and if so sends the PDN connection information request to the PDN-GW, etc.).

During the roll-out of a new standard, it can be the case that certain RATs do not have homogenous support for voice (i.e. do not support voice traffic across the entire network). For example, at the present time this is the case for LTE networks using the E-UTRAN RAT. In order to combat this, current standards define a field in the T-ADS response which indicates whether voice is supported for the UE over the RAT. However, in the method above, the PDN-GW is only aware of which RAT the IMS PDN connection is using, and is not aware of whether that RAT has homogenous support for voice, or whether, if homogenous support is not available, the UE has voice support. This information is stored in the mobility management entity, MME.

There are two alternatives presented to overcome this problem. In the first alternative, the MME provisions the PDN-GW with information as to which RATs have homogenous support for voice, e.g. the MME may indicate that homogenous support is not available on a particular E-UTRAN radio access network (RAN). The PDN-GW can then notify the HSS as to whether homogenous support for voice is available on the RAT when it responds to the PDN connection information request. If homogenous support is not available, the HSS then queries the MME to determine whether voice support is available for the UE. In the second alternative, the HSS queries the MME after it has received the RAT information from the PDN-GW.

In either of these alternatives, the determination as to whether voice support is available may only be used for a subset of the possible RATs. For example, at present this would only normally be relevant for LTE over E-UTRAN, as homogenous support for voice is generally available over RATs according to older standards.

Figure 4:
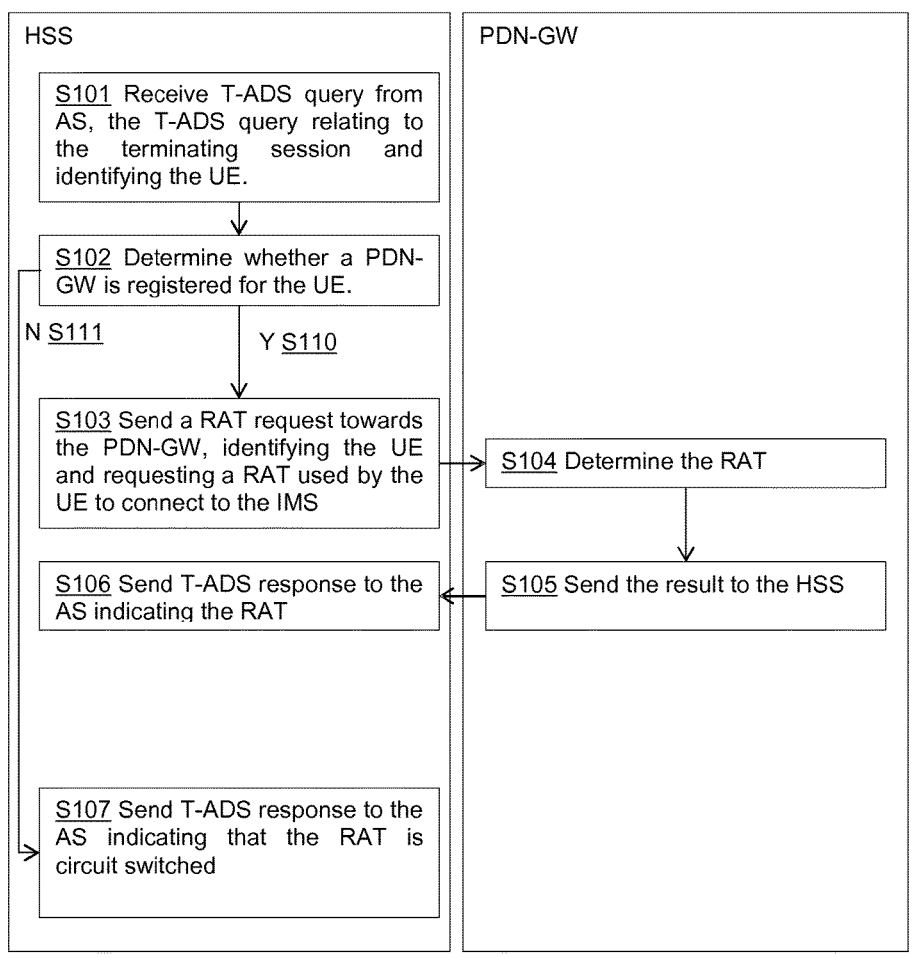
FIG. 4 is a flowchart of a method according to a further embodiment.

FIG. 4 is a flowchart of a method of determining which RAT should be used to route a terminating call to a UE. The HSS receives (S101) a T-ADS query from the AS (e.g. SCC-AS), the T-ADS query relates to the terminating session and identifies the UE. The HSS then determines (S102) whether a PDN-GW is registered for the UE. In the case where the PDN-GW is not registered (S111), the HSS sends (S105) a T-ADS response to the AS indicating that the RAT is circuit switched. In the case where the PDN-GW is registered (S110), the HSS sends a RAT request to the PDN-GW, identifying the UE and requesting a RAT used by the UE to connect to the IMS. The PDN-GW determines (S104) the RAT and sends (S105) the result back to the HSS, which sends (S106) a T-ADS response to the AS indicating the RAT.

Figure 5:
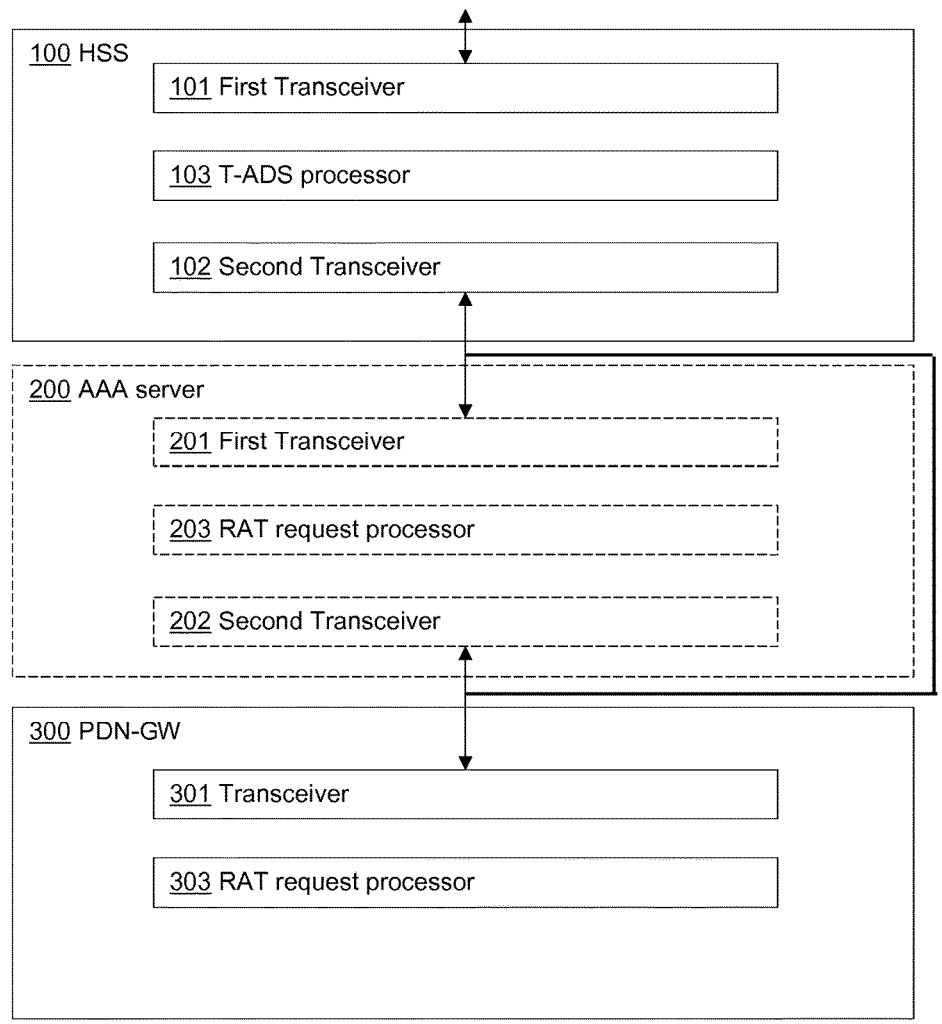
FIG. 5 is a schematic diagram of a system for implementing methods according to various embodiments.

FIG. 5 is a schematic diagram of a system for implementing the above methods. The system comprises an HSS (100)

and a PDN-GW (300). The system may also comprise a AAA server (200). Only those elements which operate differently from current standards are indicated.

The HSS 100 comprises a first transceiver (101), a second transceiver (102), and a T-ADS processor (103). The first transceiver (101) is configured to communicate with an AS of the IMS. The second transceiver (102) is configured to communicate with a PDN-GW. The T-ADS processor (103) is configured to:
 receive, via the first transceiver, a T-ADS query from the AS, the T-ADS query relating to a terminating session and identifying a user equipment, UE;
 determine whether the PDN-GW is registered for the UE;
 in the case where the PDN-GW is registered:
  send, via the second transceiver, a radio access type, RAT, request towards the PDN-GW, the request identifying the UE and requesting a RAT used by the UE to connect to the IMS network;
  receive, via the second transceiver, a result indicating the RAT from the PDN-GW;
  send, via the first transceiver, a T-ADS response to the AS indicating the RAT;
 in the case where the PDN-GW is not registered:
  send, via the first transceiver, a T-ADS response to the AS indicating that the RAT is a circuit switched RAT.

The PDN-GW (300) comprises a transceiver (301) and a RAT request processor (303). The transceiver (301) is configured to communicate with the HSS. The RAT request processor configured to:
 receive, from the HSS via the transceiver, a RAT request identifying a user equipment, UE, and requesting a RAT used by the UE to connect to the IMS;
 determine the RAT;
 send the result to the HSS via the transceiver.

The AAA server (200) comprises a first transceiver (201), a second transceiver (202), and a RAT request processor (203). The AAA server is used in the above methods if the HSS and the PDN-GW do not communicate directly. The first transceiver (201) is configured to communicate with the HSS. The second transceiver (202) is configured to communicate with the PDN-GW. The RAT request processor (203) is configured to:
 receive a RAT request from the HSS via the first transceiver, the RAT request identifying a UE;
 determine whether the PDN-GW is registered for the UE;
 in the case where the PDN-GW is registered:
  send the RAT request to the PDN-GW via the second transceiver;
  receive a result from the PDN-GW via the second transceiver;
  send the result to the HSS via the first transceiver;
 in the case where the PDN-GW is not registered:
  send a response to the HSS via the first transceiver, the response indicating that the PDN-GW is not registered.

The methods described above may be implemented by a computer program which, when run on an apparatus, causes the apparatus to perform the method.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of determining in an IP multimedia subsystem, IMS, network which radio access type, RAT, should be used to route a terminating session directed towards a user equipment, UE, the method comprising:
 receiving at a home subscriber server, HSS, a terminating access domain selection, T-ADS, query from an application server, AS, of the IMS network, the T-ADS query relating to the terminating session and identifying the UE; and
 determining whether a packet data network gateway, PDN-GW, is registered for the UE;
 in the case where a PDN-GW is registered:
  sending a RAT request from the HSS towards the PDN-GW, the RAT request identifying the UE and requesting a RAT used by the UE to connect to the IMS network;
  determining the RAT at the PDN-GW; and sending the result towards the HSS; and
  sending a T-ADS response from the HSS to the AS indicating the RAT;
 in the case where a PDN-GW is not registered:
  sending a T-ADS response from the HSS to the AS indicating that the RAT is a circuit switched RAT.

2. The method according to claim 1, wherein the RAT request and the result are sent via an authentication, authorisation, and accounting, AAA server and wherein the step of determining whether the PDN-GW is registered comprises:
 determining at the HSS whether the AAA server is registered for the UE;
 in the case where the AAA server is not registered:
  determining at the HSS that the PDN-GW is not registered;
 in the case where the AAA server is registered:
  determining at the AAA server whether the PDN-GW is registered for the UE;
 in the case where the PDN-GW is not registered:
  sending a response from the AAA server to the HSS indicating that the PDN-GW is not registered.

3. The method according to claim 1 and further comprising:
 determining at the PDN-GW whether homogenous support for voice is available for the RAT, wherein the result further comprises an indication of whether homogenous support for voice is available;
the method further comprising, in the case where homogenous support for voice is not available:
 sending a voice support query from the HSS to a mobility management entity, MME, the voice support query identifying the UE; and
 receiving a voice support response indicating whether voice is available for the UE,
 wherein the T-ADS response includes an indication as to whether voice is available for the UE.

4. The method according to claim 1, and comprising, in the case where the RAT is one of a predefined set of RATs:
 sending a voice support query identifying the UE from the HSS to the MME; and
 receiving a voice support response indicating whether voice is available for the UE,
 wherein the T-ADS response includes an indication as to whether voice is available for the UE.

5. The method according to claim 1, wherein the request and response are sent via a direct interface between the HSS and the PDN-GW.

6. An apparatus configured to operate as a home subscriber server, HSS, in an IP multimedia subsystem, IMS, network, the apparatus comprising:
    a first transceiver configured to communicate with an application server, AS, of the IMS;
    a second transceiver configured to communicate with a packet data network gateway, PDN-GW; and
    a terminating access domain selection, T-ADS, processor configured to:
        receive, via the first transceiver, a T-ADS query from the AS, the T-ADS query relating to a terminating session and identifying a user equipment, UE; and
        determine whether the PDN-GW is registered for the UE;
        in the case where the PDN-GW is registered:
            send, via the second transceiver, a radio access type, RAT, request towards the PDN-GW, the request identifying the UE and requesting a RAT used by the UE to connect to the IMS network;
            receive, via the second transceiver, a result indicating the RAT from the PDN-GW; and
            send, via the first transceiver, a T-ADS response to the AS indicating the RAT;
        in the case where the PDN-GW is not registered:
            send, via the first transceiver, a T-ADS response to the AS indicating that the RAT is a circuit switched RAT.

7. The apparatus according to claim 6, wherein the second transceiver is configured to communicate with the PDN-GW via an authentication, authorisation, and accounting, AAA server and the step of determining whether the PDN-GW is registered comprises:
    determining whether the AAA server is registered for the UE;
    in the case where the AAA server is not registered:
        determining that the PDN-GW is not registered.

8. The apparatus according to claim 6, and comprising a third transceiver configured to communicate with a mobility management entity, MME, wherein the T-ADS processor is further configured to:
    determine, using the result, whether homogenous support for voice is available for the RAT;
    in the case where homogenous support for voice is not available:
        send, via the third transceiver, a voice support query to the MME, the voice support query identifying the UE; and
        receive, from the MME via the third transceiver, a voice support response indicating whether or not voice is available for the UE,
    wherein the T-ADS response includes an indication as to whether voice is available for the UE.

9. The apparatus according to claim 6, further comprising:
    a third transceiver configured to communicate with a mobility management entity, MME, wherein the T-ADS processor is further configured to, in the case where the RAT is one of a predefined set of RATs:
    send, via the third transceiver, a voice support query to the MME, the voice support query identifying the UE; and
    receive, from the MME via the third transceiver, a voice support response indicating whether or not voice is available for the UE,
    wherein the T-ADS response includes an indication as to whether voice is available for the UE.

10. The apparatus according to claim 6, wherein the second transceiver is configured to communicate with the PDN-GW over a direct interface.

11. A computer program comprising computer readable code, which, when run on an apparatus, causes the apparatus to perform a method according to claim 1.

* * * * *